US006247845B1

United States Patent
Pedrazzini et al.

(10) Patent No.: US 6,247,845 B1
(45) Date of Patent: Jun. 19, 2001

(54) SUPPORT BASE FOR PNEUMOSTATICALLY SUPPORTED SLIDING MOBILE CARS, IN PARTICULAR FOR MEASURING AND/OR AUTOMATION EQUIPMENT

(75) Inventors: Gianandrea Pedrazzini, Segrate; Michele Berri, Rivoli, both of (IT)

(73) Assignees: Inpeco s.r.l., Segrate (IT); Coord 3 Construzioni Macchine Utensili Speciali s.a.s. di Berri & C., Bruzolo di Susa (IT)

( * ) Notice: Subject to any disclaimer, the term of this patent is extended or adjusted under 35 U.S.C. 154(b) by 0 days.

(21) Appl. No.: 09/331,584

(22) PCT Filed: Dec. 22, 1997

(86) PCT No.: PCT/EP97/07288

§ 371 Date: Jun. 30, 1999

§ 102(e) Date: Jun. 30, 1999

(87) PCT Pub. No.: WO98/29668

PCT Pub. Date: Jul. 9, 1998

(30) Foreign Application Priority Data

Dec. 31, 1996 (IT) .............................. MI96A2764

(51) Int. Cl.⁷ .................................................. F16C 32/06
(52) U.S. Cl. .............................................................. 384/12
(58) Field of Search .................................. 384/12, 13, 26, 384/37, 41, 42; 108/143; 248/424; 33/DIG. 2

(56) References Cited

U.S. PATENT DOCUMENTS

| 2,989,352 | | 6/1961 | Schmidt | 384/42 |
|---|---|---|---|---|
| 3,831,283 | * | 8/1974 | Pagella et al. | 33/559 |
| 4,657,455 | * | 4/1987 | Rogers et al. | 384/12 X |
| 4,657,734 | | 4/1987 | Yamada et al. | 419/9 |
| 4,704,712 | * | 11/1987 | Siryj | 384/12 X |
| 4,744,675 | * | 5/1988 | Sakino et al. | 384/12 |
| 4,773,769 | | 9/1988 | Church | 384/42 |
| 4,802,774 | * | 2/1989 | Pesikov | 384/12 |
| 4,913,012 | * | 4/1990 | Moran | 83/13 |
| 5,064,318 | * | 11/1991 | Cirillo | 384/12 X |
| 5,228,358 | * | 7/1993 | Sakino et al. | 384/12 X |
| 5,330,270 | * | 7/1994 | Ohmori | 384/12 X |

FOREIGN PATENT DOCUMENTS

| 2223173 | | 11/1973 | (DE) . | |
|---|---|---|---|---|
| 130069 | | 3/1978 | (DE) . | |
| 8809689 | | 11/1989 | (DE) . | |
| 0411430 | | 2/1991 | (EP) . | |
| 1483916 | * | 8/1977 | (GB) | 384/12 |
| 4-145218 | * | 5/1992 | (JP) | 384/12 |
| 9-144757 | * | 6/1997 | (JP) . | |

* cited by examiner

Primary Examiner—Charles A Marmor
Assistant Examiner—Ankur Parekh
(74) Attorney, Agent, or Firm—Jacobson Holman, PLLC

(57) ABSTRACT

The process provides for the employment of a metallic support (1) provided with channels (5) to accommodate sliding tracks (2) for pneumostatically supported slippers of a mobile car. The tracks are made by application of a respective layer of resin (2, 12) on the bottom of a respective channel (5) and subsequent mechanical machining of the same until the desired characteristics of planarity and parallelism are obtained. The layer of resin can be obtained by pouring resin (2) inside a channel (5) with a preventively roughed background or by gluing a previously formed layer of resin (12).

6 Claims, 3 Drawing Sheets

SUPPORT BASE FOR PNEUMOSTATICALLY SUPPORTED SLIDING MOBILE CARS, IN PARTICULAR FOR MEASURING AND/OR AUTOMATION EQUIPMENT

DESCRIPTION

The present invention refers to a process for the manufacture of a base for pneumostatically supported sliding of mobile cars, in particular for measuring and/or automation equipment, and to a base obtained with said process.

Pneumostatic support technology is nowadays used in those fields requiring high mechanical stiffness, high precision in the translation movement and significant reduction of drag friction: therefore, typically in the high precision measurement and mechanical assembling systems, in the field of electrical components and where the noises of traditional mechanical equipment are not compatible with their housing environment, as in automation of Laboratory Medicine.

Currently, the technology consists in maintaining between two objects with great planarity and hardness and very low roughness a thin air cushion (depending on the characteristics of the system the opening can vary between 5 and 15 microns), that represents the sliding element between the two objects. Due to the extreme precision, machining and treatment of the sliding surfaces are particularly delicate.

In the tradition of the technology the base is made of honed hard stone (fine grain black granite) on which slippers made of quenched and ground stainless steel or of anodised "packed" aluminium "fly" (in the presence of air). As known, the anodising of aluminium causes the metal to get covered with a very hard epitaxic oxide (corundum hardness).

Granite, appreciated for its mechanical stiffness and its low coefficient of thermal expansion, has a serious limitations as to weight (as a function of the dimensions required to obtain the specified stiffness) and to fragility: when hit, it chips or even worse it fractures and it irreparably loses its functionality.

Another frequent reason for system degradation is due to the presence of impurities in the air used to support the mobile part (as for example condense water or oil), impurities that can obstruct the same holes for the adduction of air to the slippers and can cause their "landing" (that is the contact between the respectively mobile surfaces) with the inevitable irreversible damaging of the surfaces containing the air cushion. Whereas the slippers are easily replaceable, the same cannot be done with the machine base, which must undergo a heavy intervention for its replacement.

Due to the weight of the granite this has been obviated by the use of metallic structurals (as for example chromium steel or anodised packed aluminium) whose shape, without compromising the structure stiffness, is such as to contain the weight of the same structure within reasonable limits.

In addition, a higher thermal expansion coefficient is obtained, which is tolerated or compensated with mathematical calculations.

But an acceptable solution to the fragility and mechanical vulnerability of the base of metallic structural shapes has not been found: in fact, even if chromium steel and anodised aluminium are less agile than stone, they are nevertheless as much vulnerable to collisions with heavy and blunt objects or to the "landing" of surfaces bearing a heavy weight and not as much hard. What stays underneath the hard material, in fact, does not represent a barrier against the possible denting of the base due to the aforementioned accidents.

Therefore the present technology of pneumostaticsupport, in view of the several advantages, bears the disadvantage of being costly and highly risky and, therefore, it is not very widespread: in particular the aspect of its risk is prejudicial to a wide employment since the damage to the sliding planes due to collisions or to the fall of heavy objects irreparably ruins the apparatus and requires the replacement of the machine base. This operation reveals being costly in terms of the intrinsic value of the piece to be replaced as well as of the inevitably very long technical time.

The object of the present invention is to implement a process capable of enabling the manufacture of a base that can be repaired in an easy manner and at low cost, in case of an accident prejudicing the well functioning of the base itself.

According to the present invention, such object has been attained by means of a process, characterised in that it involves the employment of a metallic support provided with channels for housing respective sliding tracks for pneumostatically supported slippers and the realization of each one of said tracks by application of a layer of resin on the bottom of a respective channel and subsequent mechanical machining of the same until the required characteristics of planarity and parallelism are obtained.

The idea that was at the basis of the present invention and that allowed to overcome the limitations of the known technique consists in the fact of having abandoned the conviction that the characteristic of hardness of the supporting material was absolutely essential: such characteristic, even if it bears some advantages, is not absolutely necessary to the proper functioning of a pneumostatically supported equipment. What it is necessary to guarantee is a great homogeneity of the material, a low porosity (compactness of the matrix) and its perfect machineability in such a way so as to consent the creation of a surface tat, when coupled with the sliding slipper, makes available an air cushion for the support of the mobile equipment which remains steady through time and space.

From this simple consideration, that is from the fact to consider as unessential the hardness of the support, comes the solution to the aforementioned problem. It is in fact quite evident that there are applications for which granite remains irreplaceable and one therefore accepts the limitation imposed by the material in view of its specific performance; but it is also true that in most of the aforementioned applications a traditional base offers more disadvantages than advantages.

The present inventions deals with these applications. Starting from the presupposition that the hardness of the support is not a fundamental requirement, the attention has been focused on those materials and on those processes having the following characteristics:

a. repairability of the surface (re-establishment of the conditions of suitability to the use after an accident that has altered the characteristics of the surface itself);

b. low porosity (matrix compactness);

c. perfect machineability;

d. mechanical isomorphism.

This has lead to two different embodiments of the process according to the invention.

A first embodiment provides that on the bottom of the channels of the metallic support an accentuated roughness is preliminarily produced (what is obtained sparing the elimination of the tracks produced by the mechanical roughing) and that a resin is poured on the surface thus roughed that is subsequently hardened and machined until the required characteristics of planarity and parallelism are obtained.

The hardening process can be done either at ambient temperature or in an oven and, depending on the particular resin being chosen, it could be necessary to perform the first part of the process in a vacuum chamber so as to facilitate the release of the gases entrapped in the resin during the mixing phase.

As for what concerns the type of resin, the attention has been drawn on the plastic resin that can be poured in a mechanically predisposed seating in order to guarantee an adequate mechanical as well as chemical gripping.

Such resins must also have the characteristics of being capable to be "charged" by means of powder-like components aimed at conferring particular chemical-physical-mechanical characteristics to the finished product or to contribute to increase particular characteristics already possessed by the resins themselves.

The families of resins suitable to the purpose are those of the acrylic, epoxidic; polyester and polyurethane high density resins.

As an alternative, a second form of embodiment of the process according to the invention provides that the application of the resin layer is done by gluing a strip of resin that is produced by industrial processes as those making available sheets and/or strips of methyl methacrylate or of acrylic resins or of polyester resins or of polyurethane resins. All the aforementioned products have chemical-physical-mechanical characteristics making them perfectly suitable to such applications.

An immediately evident advantage of this process is offered by the fact that the surface of the metallic support designed to receive the resin does not need to be arranged horizontally: in fact the resin can be fixed by means of a gluing and clamping process that is largely used in the wood manufacture industry.

Such new process can offer a higher productivity since the glues available nowadays do not require drying ovens or, even less, vacuum drying and the gluing operation can be accomplished on all the involved surfaces in parallel.

The aforementioned embodiments of the process according to the invention will be better understood if referred, as a non-restrictive example, to the enclosed drawings, where:

Figure 1:
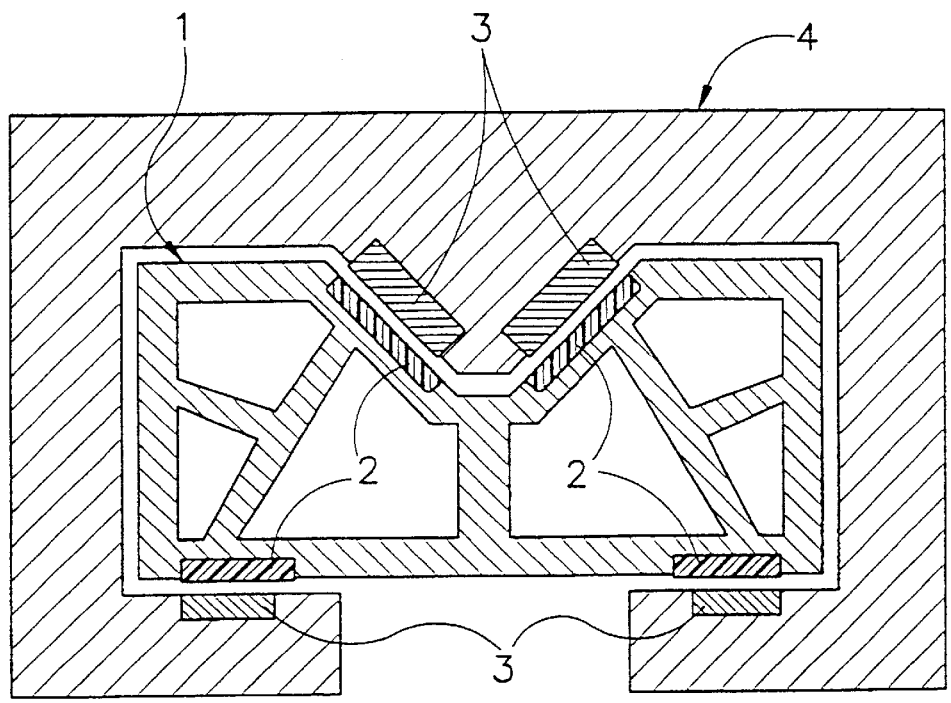
FIG. 1 shows a section view of a base produced according to the invention for pneumostatic support and guidance of a mobile car.
Figure 6:
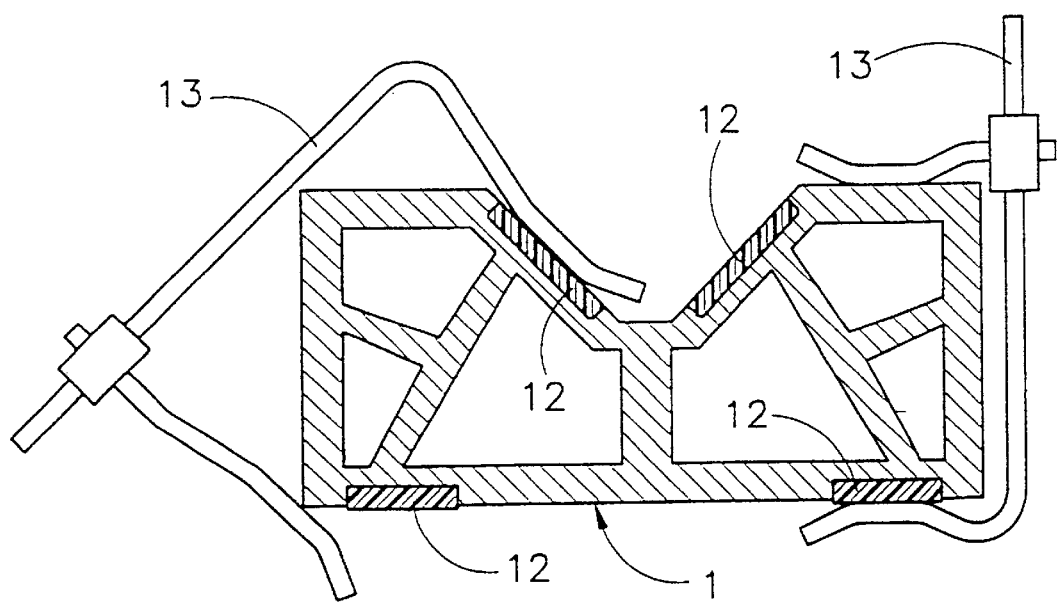
FIG. 6 shows a similar metallic section-bar base realised by a process according to the invention that provides for gluing of a resin strip.

More precisely, FIG. 1 shows a metallic section bar 1 provided with resins guides 2, on which, when supplied with compressed air, pneumostatically supported slippers 3 of a mobile car 4 "fly", for example supports for measuring and/or automated equipment.

Figure 2:
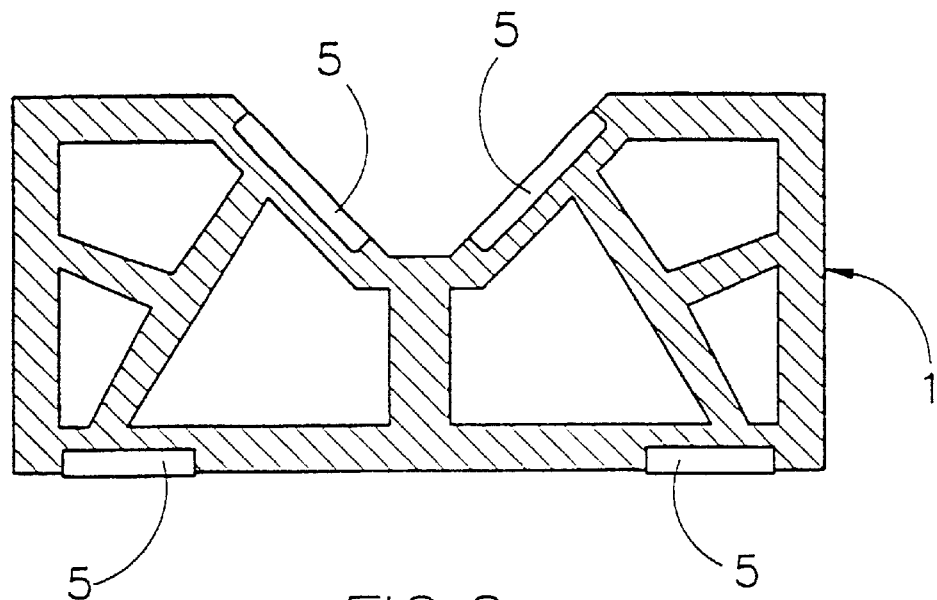
FIGS. 2–4 show different phases of the production of a metallic section-bar base realised by a process according to the invention which provides for pouring of resin.
Figure 3:
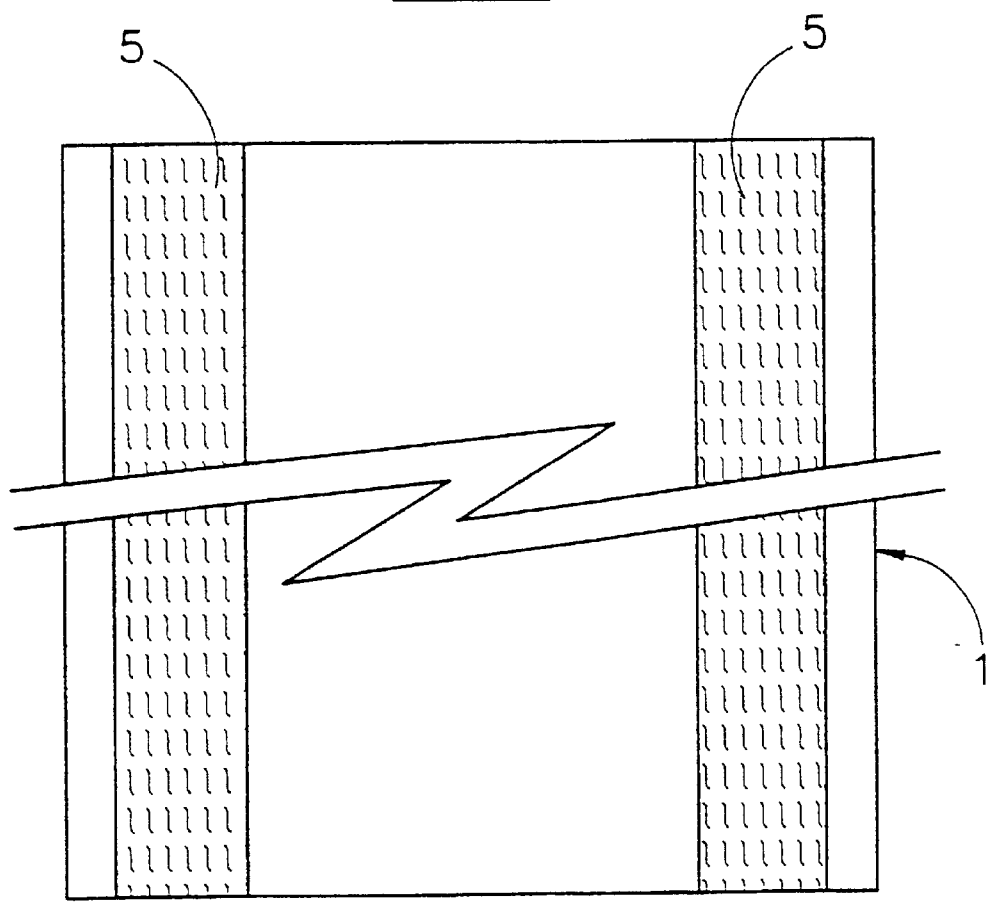

FIGS. 2 and 3 show, respectively in a cross section and in bottom view, the metallic section bar 1 after a preliminary step of the process according to the invention, during which the same section bar has been roughly carved in order to obtain parallel channels 5 having rough background surface.

Figure 4:
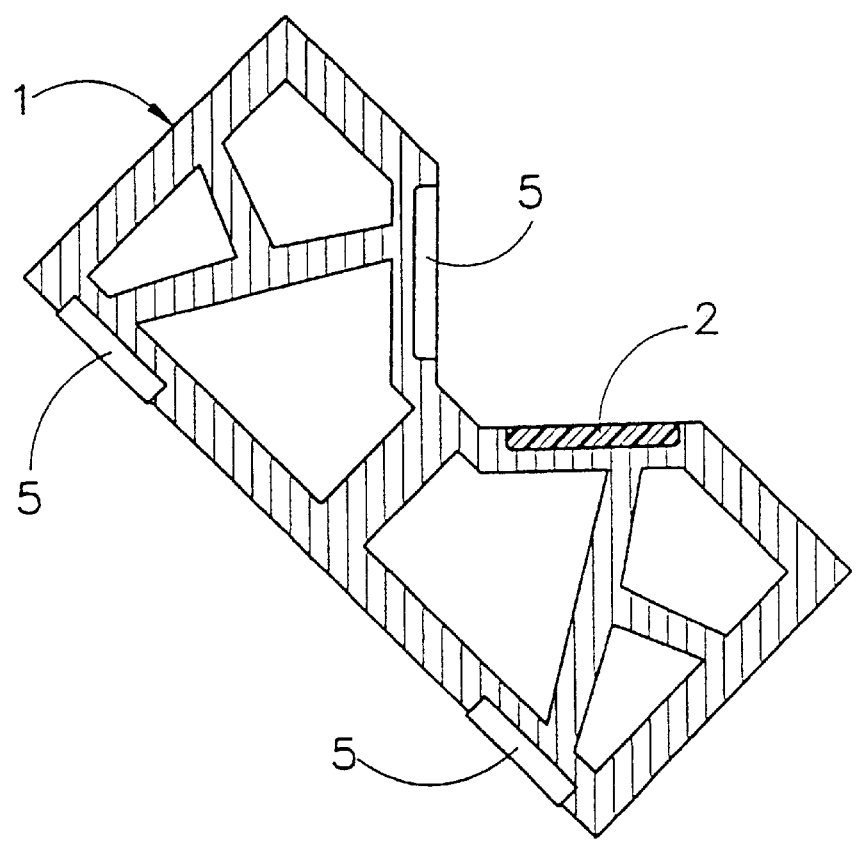

The section bar thus prepared is then placed with the single rough channels 5, first one and then the other, in absolutely parallel position with respect to the horizontal plane (FIG. 4) and is submitted to pouring of resin in the channel being arranged in turn horizontally. The containment of the poured resin is obtained by protection with adhesive tapes and/or due to the fact that the surface roughing process has been concomitant with and/or preceded by a milling work process that has left a mechanical shoulder generally not smaller than 1 mm in thickness.

The poured resin slides on the piece, permeates all the interstices of the rough surface of the channel 5 and creates a very effective chemical-mechanical gripping.

The quantity of resin being used must be such as to assure the coverage of the entire surface used for the sliding of the slippers and must have a thickness that, after hardening, can allow a subsequent mechanical machining by precision planer, with diamond -tipped tools and with ultra high cutting speed, in such a way as to obtain an absolutely plane and smooth surface.

Figure 5:
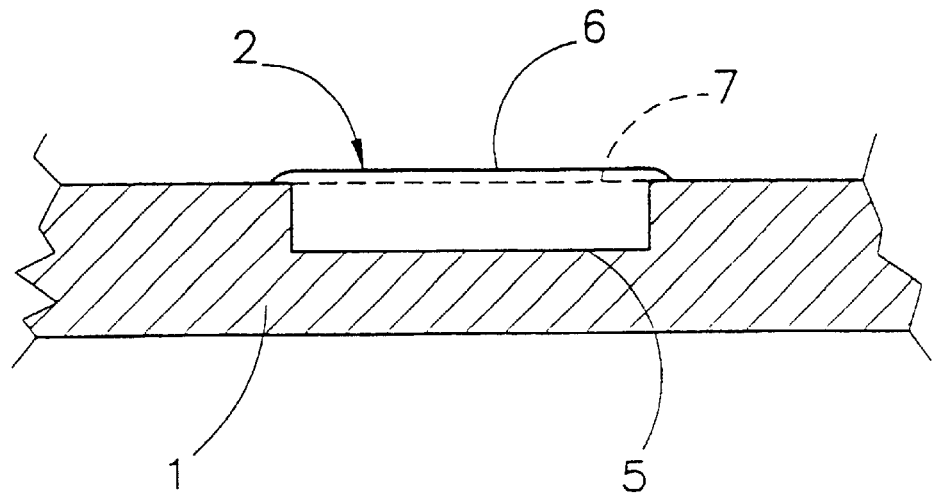
FIG. 5 shows an enlarged detail of FIG. 4.

FIG. 5 is an enlargement of the appearance of the resin surface 2 after hardening: it can be noticed that the free surface 6 of the resin has the characteristic meniscus appearance; such surface has to be brought, by subsequent finer and finer mechanical machining, almost to the lapping at level of the broken line 7.

As illustrated in FIG. 1, in case the sustaining surface should also form a guide for movement in a precise direction (rail), the sliding geometry of the car 4 requires the availability of guiding surfaces 2 arranged in dihedral: the hypothetical configurations are the most disparate (a V-shape having an angle larger, smaller or equal to 90 degrees and their combinations).

Obviously in this case the process for the preparation of the guide 2 must be accomplished in sequence since the resin pouring process requires that the surfaces involved in the same pouring are arranged parallel to the horizontal plane.

After hardening the process of resin surface machining according to processes which are conventional in the precision mechanics must follow aimed at obtaining a surface with high planarity and low roughness, in such a way as to allow that the thin layer of air accounting for the sliding interface between the bearing surface and the slipper is uniform and parallel to the surface itself.

The hardening process can take place at ambient temperature as well as in an oven and, depending on the particular resin being chosen, it could be necessary to accomplish the first part of the hardening in a vacuum chamber so as to facilitate the release of gases entrapped in the resins during the mixing phase.

As an alternative to the process described above, even better results can be obtained if the application of the resin is accomplished by gluing a resins strip 12 inside the channels 5 of the metallic section shape 1, whose preventive roughing, although preferable, is not strictly necessary any more.

The resin strip can be produced by industrial processes as the ones that make available sheets and/or strips of methyl methacrylate or of acrylic resins or of polyester resins or of polyurethane resins. All these products possess in fact chemical-physical-mechanical characteristics that make them perfectly suitable to such applications.

An immediately evident advantage with a similar process is given by the fact that the horizontal position of the metallic support designed to receive the resin is not necessary: the fixing can in fact be accomplished by a gluing and clamping process that are largely used in the wood manufactures industry.

The use of glued resin strips allows a higher productivity rate since the glues available today do not require drying ovens, or, even less, vacuum drying and the gluing process, as said before, can be accomplished in parallel on all the surfaces involved.

Naturally, also in this case, after gluing, the mechanical machining to give the sustaining system the desired and necessary characteristics of planarity and parallelism must follow. These in fact cannot be avoided even if the surface of the resin strips available on the market can appear to be highly refined.

What is claimed is:

1. A support base for sliding cars provided with pneumostatic support slippers, said support base comprising:

a metallic support body provided with parallel channels being positioned so as to face the slippers of the sliding cars when the sliding cars are mounted on the support body, and said parallel channels being filled with resin tracks having a smooth surface for a sliding pneumostatic coupling with the slippers when the sliding cars are mounted on said support body.

2. The support base according to claim 1, wherein said parallel channels have a rough bottom surface and said resin tracks are made of resin poured into said parallel channels.

3. The support base according to claim 1, wherein said resin tracks are made of resin strips glued on to the bottom of said parallel channels.

4. An apparatus comprising a support base, and a sliding car movably resting on the support base through pneumostatically supported slippers, the support base being formed by a metallic support body provided with parallel channels facing said slippers, and said parallel channels being filled with resin tracks having a smooth surface for a pneumostatic sliding engagement with said slippers.

5. The apparatus according to claim 4, wherein said parallel channels have a rough bottom surface and said resin tracks are made of resin poured into said parallel channels.

6. The apparatus according to claim 4, wherein said resin tracks are made of resin strips glued on to the bottom of said parallel channels.

* * * * *